(12) United States Patent
Shibuya

(10) Patent No.: US 8,256,780 B2
(45) Date of Patent: Sep. 4, 2012

(54) VEHICLE STEERING DEVICE

(75) Inventor: Hiroshi Shibuya, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 260 days.

(21) Appl. No.: 12/674,098

(22) PCT Filed: Nov. 21, 2008

(86) PCT No.: PCT/IB2008/003163
§ 371 (c)(1),
(2), (4) Date: Feb. 18, 2010

(87) PCT Pub. No.: WO2009/066160
PCT Pub. Date: May 28, 2009

(65) Prior Publication Data
US 2011/0089657 A1 Apr. 21, 2011

(30) Foreign Application Priority Data

Nov. 22, 2007 (JP) ................................. 2007-302370

(51) Int. Cl.
*B62D 7/16* (2006.01)

(52) U.S. Cl. ................ 280/93.51; 280/5.51; 280/93.512

(58) Field of Classification Search ............... 280/5.509, 280/5.51, 442, 443, 86.75, 124.11, 124.125, 280/124.126, 124.133, 124.135, 124.143, 280/124.15, 93.502, 93.51, 93.512
See application file for complete search history.

(56) References Cited

U.S. PATENT DOCUMENTS

| | | | | |
|---|---|---|---|---|
| 2,223,274 A | * | 11/1940 | Hutton | 180/409 |
| 2,480,309 A | * | 8/1949 | Tapp et al. | 280/638 |
| 2,516,074 A | * | 7/1950 | Remde | 280/93.506 |
| 2,863,518 A | * | 12/1958 | Italo | 180/414 |
| 3,229,992 A | * | 1/1966 | Traywick | 280/5.522 |
| 3,587,767 A | * | 6/1971 | Gamaunt | 180/431 |
| 4,373,743 A | * | 2/1983 | Parsons, Jr. | 280/124.138 |
| 4,546,997 A | * | 10/1985 | Smyers | 280/5.509 |
| 4,632,413 A | * | 12/1986 | Fujita et al. | 280/124.103 |
| 4,650,213 A | * | 3/1987 | Fujita et al. | 280/124.103 |

(Continued)

FOREIGN PATENT DOCUMENTS

| | | |
|---|---|---|
| DE | 2 121 262 | 11/1972 |
| JP | 6 255527 | 9/1994 |

(Continued)

OTHER PUBLICATIONS

German Office Action issued Jul. 13, 2011, in Patent Application No. 11 2008 003 171.1 (with English-language translation).

*Primary Examiner* — Paul N Dickson
*Assistant Examiner* — Laura Freedman
(74) *Attorney, Agent, or Firm* — Oblon, Spivak, McClelland, Maier & Neustadt, L.L.P.

(57) ABSTRACT

A steering device includes left and right arm mechanisms each including a front arm and a rear arm whose one ends are rotatably connected to a wheel-mounting portion at wheel-side connecting points and whose other ends are rotatably connected at body-side connecting points. The front arm and rear arm of the arm mechanisms each include a plurality of links, and adjacent links are rotatably connected to each other at an intermediate connecting point. An arm driving device drives the arm mechanisms independently from each other such that the angles of individual links around the connecting points are uniquely determined.

15 Claims, 6 Drawing Sheets

U.S. PATENT DOCUMENTS

| | | | | |
|---|---|---|---|---|
| 4,779,880 | A | * | 10/1988 | Hyodo .................. 180/410 |
| 5,020,812 | A | * | 6/1991 | Sugiyama ................ 180/409 |
| 5,257,801 | A | * | 11/1993 | Matsuzawa et al. ... 280/124.138 |
| 5,722,504 | A | * | 3/1998 | Gaetani .................. 180/411 |
| 6,142,494 | A | * | 11/2000 | Higuchi ................ 280/93.51 |
| 6,402,170 | B1 | * | 6/2002 | Hurlburt ................ 280/103 |
| 7,389,998 | B2 | * | 6/2008 | Kondo et al. ......... 280/93.502 |
| 7,416,201 | B2 | * | 8/2008 | Davey ............... 280/124.126 |
| 7,562,884 | B2 | * | 7/2009 | Saibold et al. ........ 280/93.502 |
| 2007/0187917 | A1 | * | 8/2007 | Hasegawa et al. ...... 280/93.51 |
| 2010/0219600 | A1 | * | 9/2010 | Dada .................. 280/124.127 |
| 2011/0101637 | A1 | * | 5/2011 | Shibuya ............... 280/86.758 |

FOREIGN PATENT DOCUMENTS

| | | | |
|---|---|---|---|
| JP | 07101216 | A * | 4/1995 |
| JP | 2004 168092 | | 6/2004 |
| JP | 2007 8285 | | 1/2007 |
| JP | 2008174056 | A * | 7/2008 |

\* cited by examiner

VEHICLE STEERING DEVICE

BACKGROUND OF THE INVENTION

1. Field of the Invention

The present invention relates to a device for steering vehicle wheels.

2. Description of the Related Art

Japanese Patent Application Publication No. 2007-8285 (JP-A-2007-8285) discloses a steering device in which the vehicle body and the wheel-mounting portion on one side are connected to each other by a pair of front and rear arms that can extend and contract, and the lengths of the front and rear arms are changed as appropriate to make a virtual kingpin axis variable. Other than this, Japanese Patent Application Publication No. 6-255527 (JP-A-6-255527) also discloses a technique related to the present invention.

In the case of the steering device described above, sometimes not enough arm length can be obtained during a turn, making it impossible to ensure a large steering angle.

SUMMARY OF THE INVENTION

The present invention provides a vehicle steering device that ensures a larger steering angle than in the related art while making a virtual kingpin axis variable.

A vehicle steering device according to a first aspect of the present invention includes left and right arm mechanisms placed between a vehicle body and respective wheel-mounting portions, and arm driving means for driving the left and right arm mechanisms independently from each other. Each of the left and right arm mechanisms has a front arm and a rear arm. One end of the front arm is rotatably connected at a wheel-side front connecting point to the wheel-mounting portion, and the other end is rotatably connected at a body-side front connecting point to the vehicle body. Also, one end of the rear arm is rotatably connected at a wheel-side rear connecting point to the wheel-mounting portion, and the other end is rotatably connected at a body-side rear connecting point to the vehicle body. The wheel-side front connecting point and the wheel-side rear connecting point are spaced apart from each other in a longitudinal direction of a vehicle, and the body-side front connecting point and the body-side rear connecting point are spaced apart from each other in the longitudinal direction of the vehicle. The front arm and the rear arm each include a plurality of links. Adjacent links thereof are rotatably connected to each other at an intermediate connecting point. The arm driving means drives the left and right arm mechanisms such that angles of the links around the body-side front connecting point, the body-side rear connecting point, the intermediate connecting points, the wheel-side front connecting point, and the wheel-side rear connecting point are uniquely determined.

With the steering device according to the first aspect of the present invention, driving the links of the individual arm mechanisms by the arm driving means to vary the angles of the individual links allows to change the position and angle of the wheel-mounting portion to make the virtual kingpin axis variable while providing a required steering angle to the wheel. Since each of the front arm and the rear arm is mounted to rotatably connect a plurality of links at the intermediate connecting point, as compared with a case where each of the front arm and the rear arm is formed by a single link, the distance between the body-side connecting point and the wheel-side connecting point can be adjusted over a larger range. This makes it possible to provide a larger steering angle than in the related art.

The arm driving means has a number of link driving devices equal to a number obtained by subtracting 3 from a total number of the body-side front connecting point, the body-side rear connecting point, the intermediate connecting points, the wheel-side front connecting point, and the wheel-side rear connecting point in each of the left and right arm mechanisms. The link driving devices are respectively placed in association with a number of connecting points equal to the number of the link driving devices and selected from among the body-side front connecting point, the body-side rear connecting point, the intermediate connecting points, the wheel-side front connecting point, and the wheel-side rear connecting point. The link driving devices rotationally drive the links around corresponding connecting points to specify angles of the links. Each of the front arm and rear arm includes a minimum of two links. For example, in a case where each of the front arm and rear arm includes two links, each arm mechanism forms a link mechanism having a total of six connecting points including a pair of body-side connecting points, a pair of wheel-side connecting points, and a pair of intermediate connecting points. Since the space between the wheel-side connecting points can be regarded as a single link, and the space between the body-side connecting points can be regarded as a single link fixed to the vehicle body, if the angles of links around a number of connecting points equal to the total number of connecting points minus 3 are specified, the positions of the remaining three connecting points are also uniquely determined. Thus, it is possible to make the position of a virtual kingpin axis for the wheel variable by operating the arm mechanism, while providing a required steering angle to the wheel.

The link driving devices may each include a servomotor. Link angles can be easily specified by rotationally driving the links around the connecting points by the servomotors. Further, when the link angles are specified by the link driving devices, link angles around the other three connecting points are also uniquely determined, so there is no need for actively controlling the positions of those connecting points. Therefore, as a result of the angles of the links around the selected connecting points being specified by the link driving devices, angles of links around unselected connecting points with which the link driving devices are not associated may be determined. This minimizes the number of link driving devices required for operating the arm mechanism, thereby achieving reduced device size and simplified control. Further, the front arm may connect between the body-side front connecting point and the wheel-side front connecting point by the plurality of links that are connected in series, the rear arm may connect between the body-side rear connecting point and the wheel-side rear connecting point by the plurality of links that are connected in series, and mutually adjacent links of the plurality of links may be rotatably connected to each other at the intermediate connecting point.

A second aspect of the present invention provides a vehicle steering device including an arm mechanism that is placed between a vehicle body and a wheel-mounting portion and has a front arm and a rear arm. The front arm has one end rotatably connected at a wheel-side front connecting point to the wheel-mounting portion, and the other end is rotatably connected at a body-side front connecting point to the vehicle body. The rear arm has one end rotatably connected at a wheel-side rear connecting point to the wheel-mounting portion, and the other end is rotatably connected at a body-side rear connecting point to the vehicle body. The wheel-side front connecting point and the wheel-side rear connecting point are spaced apart from each other in a longitudinal direction of a vehicle. The body-side front connecting point and the body-side rear connecting point are spaced apart from each other in the longitudinal direction of the vehicle and fixed in position with respect to the vehicle body. The front arm and the rear arm each includes a plurality of links. Adjacent links of the plurality of links are rotatably connected to each other at an intermediate connecting point.

As described above, in the steering device according to the present invention, each of the front arm and rear arm has a plurality of links that are rotatably connected at the intermediate connecting point. Therefore, as compared with a case where each of the front arm and the rear arm is formed by a single link, the distance between the body-side connecting point and the wheel-side connecting point can be adjusted over a larger range. As a result, a larger steering angle can be provided to the wheel than in the related art.

BRIEF DESCRIPTION OF THE DRAWING

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
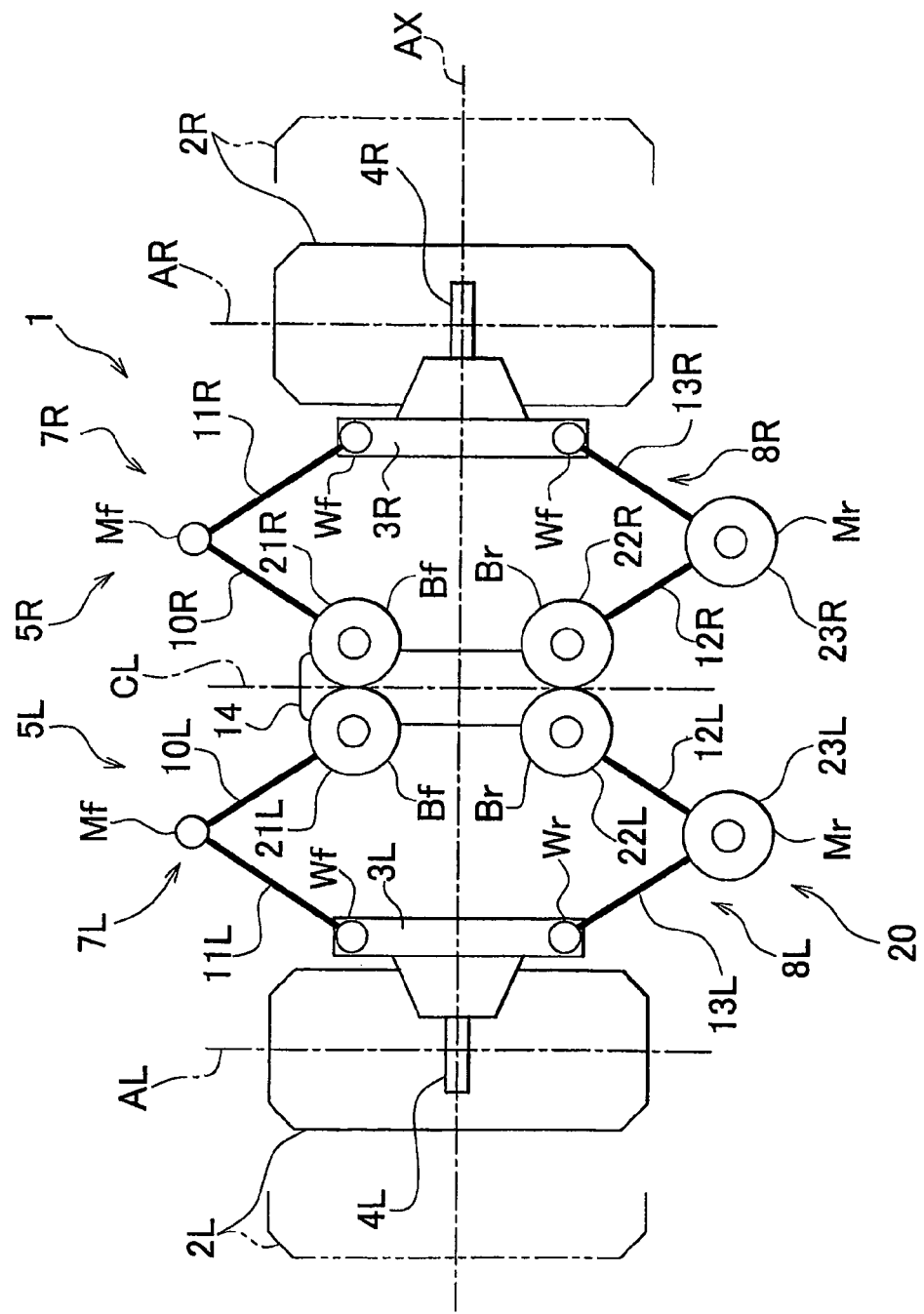
FIG. 1 is a view showing a state of a steering device according to an embodiment of the present invention when a vehicle is traveling straight ahead.

FIG. 1 shows a state of a steering device according to an embodiment of the present invention when a vehicle is traveling straight ahead. In the attached drawings, suffixes L and R are provided to reference numerals indicating individual components to differentiate between the left and right. However, these suffixes may sometimes be omitted in the following description when there is no need to differentiate between the left and right. A steering device 1 in FIG. 1 steers left and right front wheels 2L, 2R of a passenger vehicle. The front wheels 2L, 2R are mounted to wheel-mounting portions 3L, 3R, respectively. The wheel-mounting portions 3L, 3R are assembly parts including spindles 4L, 4R serving as the centers of rotation of the front wheels 2L; 2R. Alternatively, the front mounting portion 3 may be an in-wheel motor, in which case, the output shaft of the in-wheel motor is the spindle 4.

The steering device 1 includes left and right arm mechanisms 5L, 5R that are respectively provided in correspondence to the left and right wheel-mounting portions 3. The arm mechanisms 5L, 5R are symmetrical about the longitudinal centerline CL of the vehicle. The left arm mechanism 5L has a pair of arms, a front arm 7L and a rear arm 8L, which are arranged in the longitudinal direction (vertical direction in FIG. 1) of the vehicle. The front arm 7L includes an inner link 10L and an outer link 11L. One ends of the respective links are rotatably connected to each other at an intermediate connecting point Mf. The rear arm 8L includes an inner link 12L and an outer link 13L. One ends of the respective links are rotatably connected to each other at an intermediate connecting point Mr. The other ends of the inner links 10L, 12L are rotatably connected to an arm-mounting portion 14, which forms a part of the vehicle body, at body-side connecting points Bf, Br, respectively. The body-side connecting points Bf, Br are spaced apart from each other in the longitudinal direction, and their positions are fixed with respect to the vehicle body. The other ends of the outer links 11L, 13L are rotatably connected to the wheel-mounting portion 3L at wheel-side connecting points Wf, Wr, respectively. The wheel-side connecting points Wf, Wr are spaced apart from each other in the longitudinal direction. That is, the front arm 7L and the rear arm 8L have a plurality of links 10L, 11L and 12L, 13L that are connected in series from the body-side connecting points Bf, Br to the wheel-side connecting points Wf, Wr via the intermediate connecting points Mf, Mr, respectively. The front arm 7L and the rear arm 8L are longitudinally symmetrical about an axle centerline AX. The axle centerline AX is a line along the vehicle width direction connecting between the spindles 4L, 4R when the front wheels 2L, 2R are pointing straight ahead. In this embodiment, the links 10L, 11L, 12L, 13L has a fixed length.

Likewise, the right arm mechanism 5R has a pair of arms, a front arm 7R and a rear arm 8R, which are arranged in the longitudinal direction of the vehicle. The front arm 7R includes an inner link 10R and an outer link 11R. One ends of the respective links are rotatably connected to each other at an intermediate connecting point Mf. The rear arm 8R includes an inner link 12R and an outer link 13R. One ends of the respective links are rotatably connected to each other at an intermediate connecting point Mr. The other ends of the inner links 10R, 12R are rotatably connected to the arm-mounting portion 14 at body-side connecting points Bf, Br, respectively. The body-side connecting points Bf, Br are spaced apart from each other in the longitudinal direction, and their positions are fixed with respect to the vehicle body. The other ends of the outer links 11R, 13R are rotatably connected to the wheel-mounting portion 3R at wheel-side connecting points Wf, Wr, respectively. The wheel-side connecting points Wf, Wr are spaced apart from each other in the longitudinal direction. That is, the front arm 7R and the rear arm 8R have a plurality of links 10R, 11R and 12R, 13R that are connected in series from the body-side connecting points Bf, Br to the wheel-side connecting points Wf, Wr via the intermediate connecting points Mf, Mr, respectively. The front arm 7R and the rear arm 8R are longitudinally symmetrical about the axle centerline AX. In this embodiment, the links 10R, 11R, 12R, 13R has a fixed length.

As is apparent from the above description, each arm mechanism 5 is a 6-joint link mechanism that connects six link elements, that is, the wheel-mounting portion 3, the links 10 to 13, and the arm-mounting portion 14, rotatably to each other at six connecting points Bf, Mf, Wf, Wr, Mr, Br. The steering device 1 is provided with an arm driving device 20 as arm driving means for driving the arm mechanisms 5L, 5R independently from each other. The arm driving device 20 has a first servomotor 21, a second servomotor 22, and a third servomotor 23 that are provided for each arm mechanism 5, as link driving devices for rotationally driving the links 10, 12, 13 to specify their angles. The first servomotor 21 rotationally drives the inner link 10 around the connecting point Bf with respect to the arm-mounting portion 14, and the second servomotor 22 rotationally drives the inner link 12 around the connecting point Br with respect to the arm-mounting portion 14. The third servomotor 23 rotationally drives the outer link 13 around the connecting point Mr with respect to the inner link 12 of the rear arm 8. As the angles of the links 10, 12, 13 are uniquely specified by the servomotors 21 to 23, the positions of the five connecting points Bf, Br, Mf, Mr, Wr are uniquely determined. As a result, the position of the one remaining connecting point Wf is also uniquely determined. That is, in each arm mechanism 5, by adjusting the angles of the links 10, 12, 13 by the servomotors 21 to 23, a virtual kingpin axis Kp of the front wheel 2 and the inclination (steering angle) of the wheel-mounting portion 3 with respect to the longitudinal centerline CL are uniquely determined.

In a state with the links 10 to 13 of each arm mechanism 5 folded to the maximum extent possible by the servomotors 21 to 23, the front wheels 2L, 2R are pointed straight ahead. In this straight-ahead state, the arms 10 to 13 of the arm mechanisms 5L, 5R are laterally symmetrical, and in each arm mechanism 5, the wheel-side connecting points Wf, Wr align in the longitudinal direction. The distances from the longitudinal centerline CL of the vehicle to the centerlines AL, AR of the front wheels 2L, 2R are equal to each other.

Figure 2:
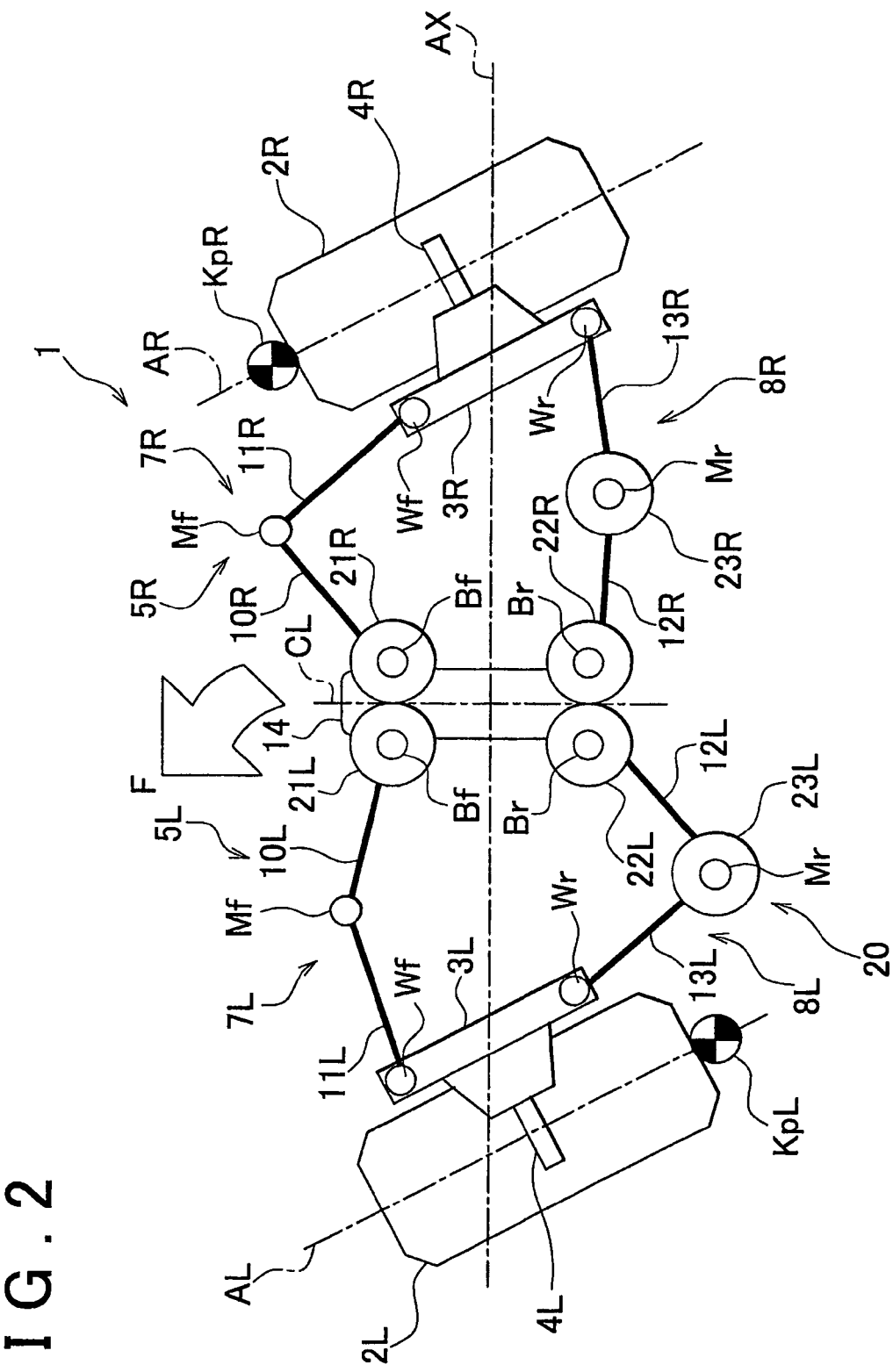
FIG. 2 is a view showing how a left turn is executed with a virtual kingpin axis set at each of the front and rear ends of the front wheel.

FIG. 2 shows an example of the state of the steering device 1 during a left turn. In this example, the left front wheel 2L is steered around the virtual kingpin axis KpL that is set at its rear end and on the centerline AL, and the right front wheel 2R is steered around the virtual kingpin axis KpR that is set at its front end and on the centerline AR. The operations of the servomotors 21 to 23 when steering the vehicle from the straight-ahead state in FIG. 1 to the state in FIG. 2 are as follows. First, with regard to the left arm mechanism 5L, the first servomotor 21L is driven so as to rotate the link 10L counterclockwise around the connecting point Bf, the second servomotor 22L is driven so as to rotate the link 12L clockwise around the connecting point Br, and the third servomotor 23L is driven so as to rotate the link 13L counterclockwise to an extent that makes the length of the front arm 7L (the distance between the connecting points Bf, Wf) substantially maximum. On the other hand, with regard to the right arm mechanism 5R, the first servomotor 21R is driven so as to rotate the link 10R clockwise around the connecting point Bf, the second servomotor 22R is driven so as to rotate the link 12R counterclockwise around the connecting point Br, and the third servomotor 23R is driven so as to rotate the link 13R clockwise to an extent that makes the length of the rear arm 8R (the distance between the connecting points Br, Wr) substantially maximum.

Figure 3:
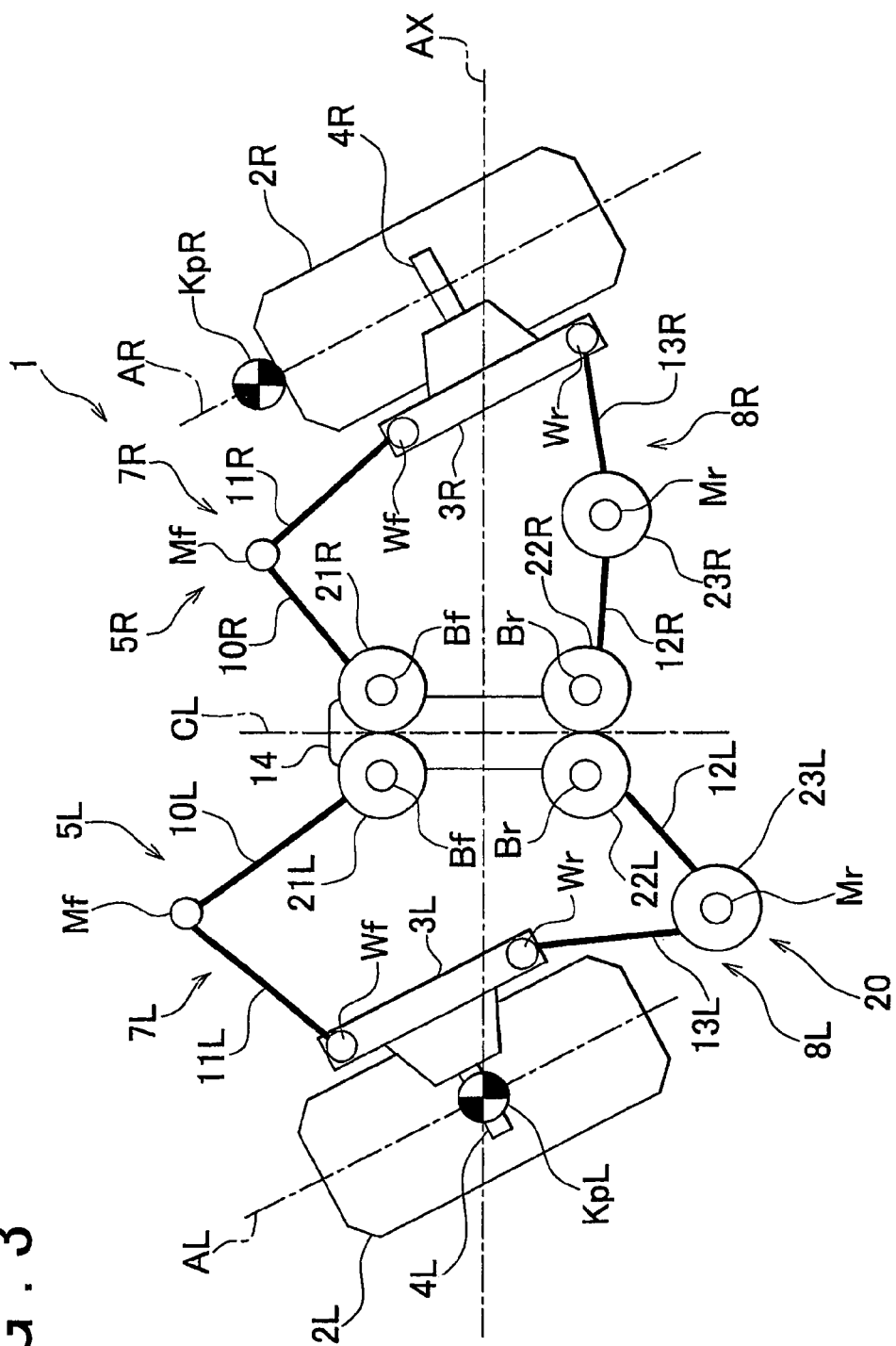
FIG. 3 is a view showing how a left turn is executed, with a virtual kingpin axis for the inside turning wheel set at the center of the front wheel and a virtual kingpin axis for the outside turning wheel set at the front end of the front wheel.

FIG. 2 shows one illustrative example of steering of the front wheel 2. With the steering device 1 according to this embodiment, the virtual kingpin axis Kp can be set not only at the front or rear end of the front wheel 2 but at an arbitrary position, by driving the servomotors 21 to 23 of each arm mechanism 5 as appropriate. For example, as shown in FIG. 3, as for the left front wheel 2L that becomes the inside turning wheel, it is possible to set the virtual kingpin axis KpL at the center of its ground-contacting surface and steer the front wheel 2L around this virtual kingpin axis KpL. On the other hand, as for the right front wheel 2R that becomes the outside turning wheel, it is possible to set the virtual kingpin axis KpR at the same position as that in FIG. 2 and steer the front wheel 2R around this virtual kingpin axis KpR. Therefore, according to the steering device 1 of this embodiment, the virtual kingpin axis Kp can be set at an optimum position in accordance with the vehicle's loading condition, longitudinal weight distribution, vehicle speed; road condition, and the like. A conceivable way of setting the virtual kingpin axis Kp is to set the virtual kingpin axis Kp in the manner as illustrated in FIG. 2 when a large steering angle is required, for example. Alternatively, in situations where the steering torque of the front wheel 2 becomes large, such as when steering while at idle in a parking lot, the steering torque can be minimized by setting the virtual kingpin axis Kp at substantially the center of the ground-contacting surface of the front wheel 2, like the left front wheel 2L in FIG. 3.

Further, as is apparent from the example in FIG. 3, in this embodiment, the left and right arm mechanisms 5L, 5R can be driven independently from each other. It is thus also possible to adjust the Ackerman rate. The Ackerman rate refers to the ratio between the left and right steering angles in a turn. Alternatively, by applying the steering device 1 according to this embodiment to front and rear wheels, a four-wheel steering function can be easily realized.

Further, the steering device 1 according to this embodiment also makes it possible to change the tread between the front wheels 2L, 2R. That is, by driving the servomotors 21 to 23 in such a way that the wheel-side connecting points Wf, Wr are displaced equally in the direction along the axle centerline AX, the tread can be increased as indicated by the imaginary line (chain double-dashed line) in FIG. 1, or the increased tread can be reduced again, without changing the steering angle of the front wheel 2. This makes it possible to realize changes in tread according to the drive condition, such as by setting the thread small during traveling on an ordinary road or in an urban area, or increasing the thread during traveling on an expressway to enhance the stability of the vehicle.

At the connecting points Bf, Br, Mf, Mr, Wf, Wr of the links 10 to 13, the connecting structure may be so determined as to allow the arms 7, 8 to rotate around the vertical axis of the vehicle. It should be noted, however, that by connecting the links via bushes, spherical bearings, or the like, the arms 7, 8 may be allowed to rotate somewhat around the horizontal axis as well with respect to the wheel-mounting portion 3 or the arm-mounting portion 14. Vertical movement of the front wheels 2L, 2R with respect to the vehicle body may be permitted by making the arms 7, 8 vertically displaceable with respect to the wheel-mounting portion 3 or the arm-mounting portion 14. In this case, a spring or damper may be provided between the vehicle body and the arms 7, 8 to allow the arm mechanism 5 to function as a suspension. Also, the front wheel 2 may be supported by a suspension mechanism provided separately from the steering device 1 so that the steering device 1 is responsible only for the steering drive of the front wheel 2.

Figure 4:
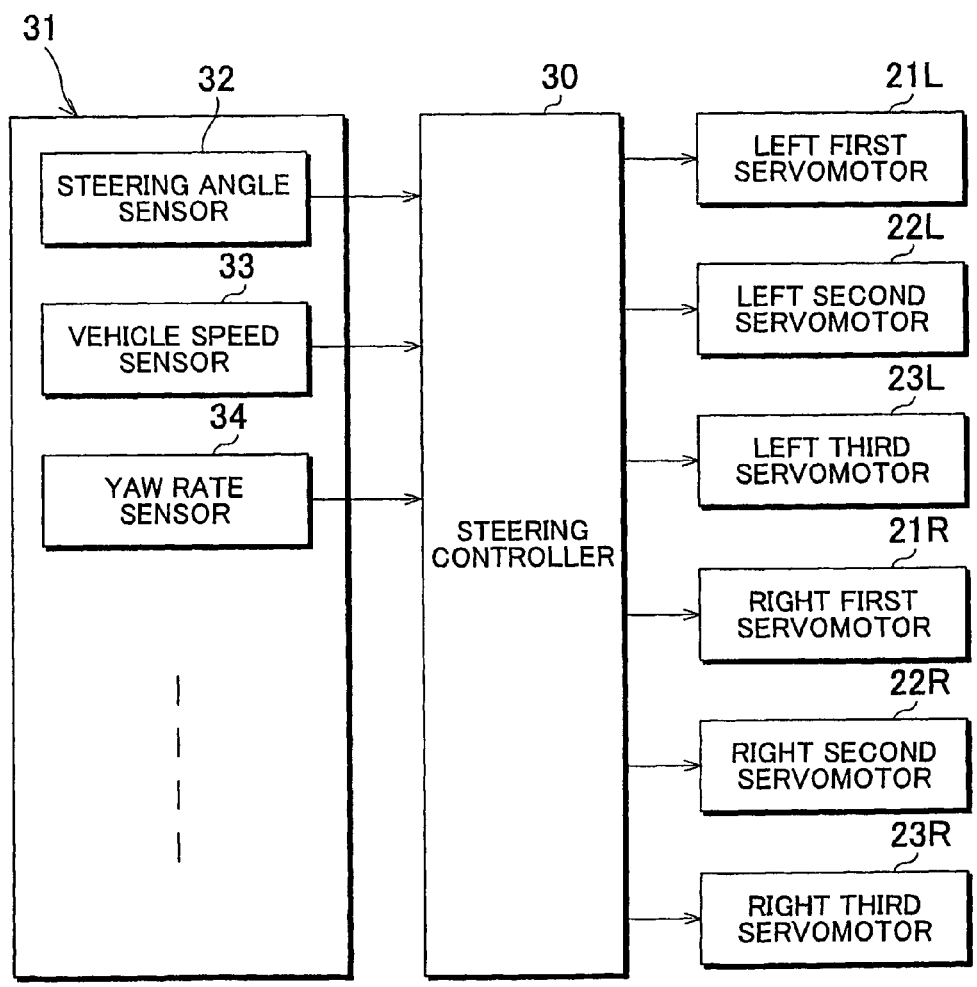
FIG. 4 is a block diagram showing the schematic configuration of the control system of the steering device shown in FIG. 1.

Next, a description will be given of a control system provided to the steering device 1 in order to cause the arms 7, 8 to act in conjunction with operation of a steering member (not shown) (typically, a steering wheel) of the vehicle. FIG. 4 is a block diagram of the control system. The control system of the Steering device 1 includes a steering controller (hereinafter, abbreviated as "controller") 30 that is steering control means for controlling the actions of the servomotors 21 to 23 in conjunction with operation of the steering member. The controller 30 is configured as a computer unit. The controller 30 is connected with the above-described left and right servomotors 21 to 23 as its control targets. The controller 30 is connected with a state detecting device 31 that detects various states that are to be referred to in the control of the servomotors 21 to 23. The state detecting device 31 includes a steering angle sensor 32 that detects an operation angle (steering operation angle) of the steering member from the neutral position (position when traveling straight ahead). The term steering operation angle as used herein includes information that makes it possible to identify the operation direction of the steering member from the neutral position. Other than the steering angle sensor 32, the state detecting device 31 may also include various sensors such as a vehicle speed sensor 33 and a yaw rate sensor 34 which detect parameters indicating the vehicle's motion state (hereinafter, referred to as vehicle motion parameters). As vehicle motion parameters to be referred to, a body slip angle, lateral G-force, or the like may be also selected as appropriate, other than the vehicle speed or yaw rate. Further, the state detecting device 31 may include a sensor that detects the axial loads on the front and rear wheels of the vehicle, or a sensor that detects the road surface state. The state detecting device 31 may include not only sensors but also, for example, input means for inputs from the driver of the vehicle.

Figure 5:
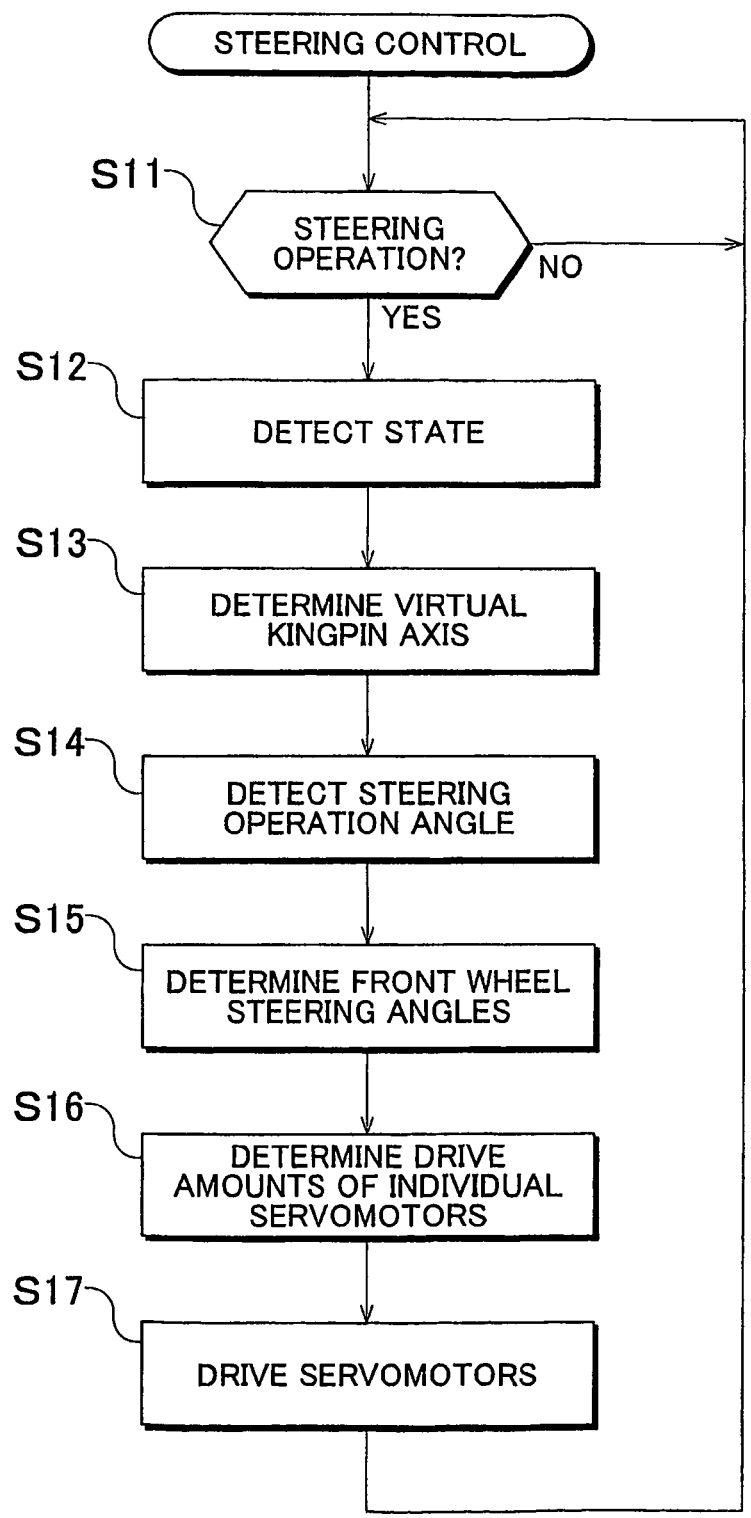
FIG. 5 is a flowchart showing a steering control routine that is executed by a steering controller shown in FIG. 4.

FIG. 5 is a flowchart showing a steering control routine that is executed by the controller 30 to steer the front wheel 2. In this routine, first, it is determined in step S11 whether or not the steering member has been operated, on the basis of an output signal from the steering angle sensor 24. If no steering operation has been made, the process is suspended, and the process proceeds to the next step S12 if a steering operation is made. In step S12, the state in which the vehicle is placed is detected by referring to an output from the state detecting device 31. In the next step S13, the positions of the virtual kingpin axes KpL, KpR corresponding to the detected state are determined. For example, the process of step S13 can be realized by classifying states that are detected by the state detecting device 31 into several types, calculating the optimum virtual kingpin axes Kp for individual types in advance by computer simulation or the like and creating table data of these correspondences, and storing the table data into the ROM of the controller 30.

After the position of the virtual kingpin axis Kp is determined in step S13, a steering operation angle of the steering member is detected in step S14. In step S15 that follows, steering angles for the respective front wheels 2L, 2R according to the steering operation angle are determined. Subsequently, in step S16, drive amounts for the respective servomotors 21 to 23 are determined on the basis of the position of the virtual kingpin axis Kp and the steering angles. The servomotors 21 to 23 are driven in accordance with the determined drive amounts in step S17. Thereafter, the process is returned to step S11, and the same procedure is repeated subsequently.

In the case described above with reference to FIG. 5, the steering angles of the front wheels 2L, 2R are controlled while controlling the position of the virtual kingpin axis Kp in accordance with operation of the steering member. However, in a case where the tread is made variable as described above, for example, the driver may be made to select a drive mode, and the servomotors 21 to 23 may be controlled in such a way that the optimum tread is set in accordance with the selection result.

Figure 6:
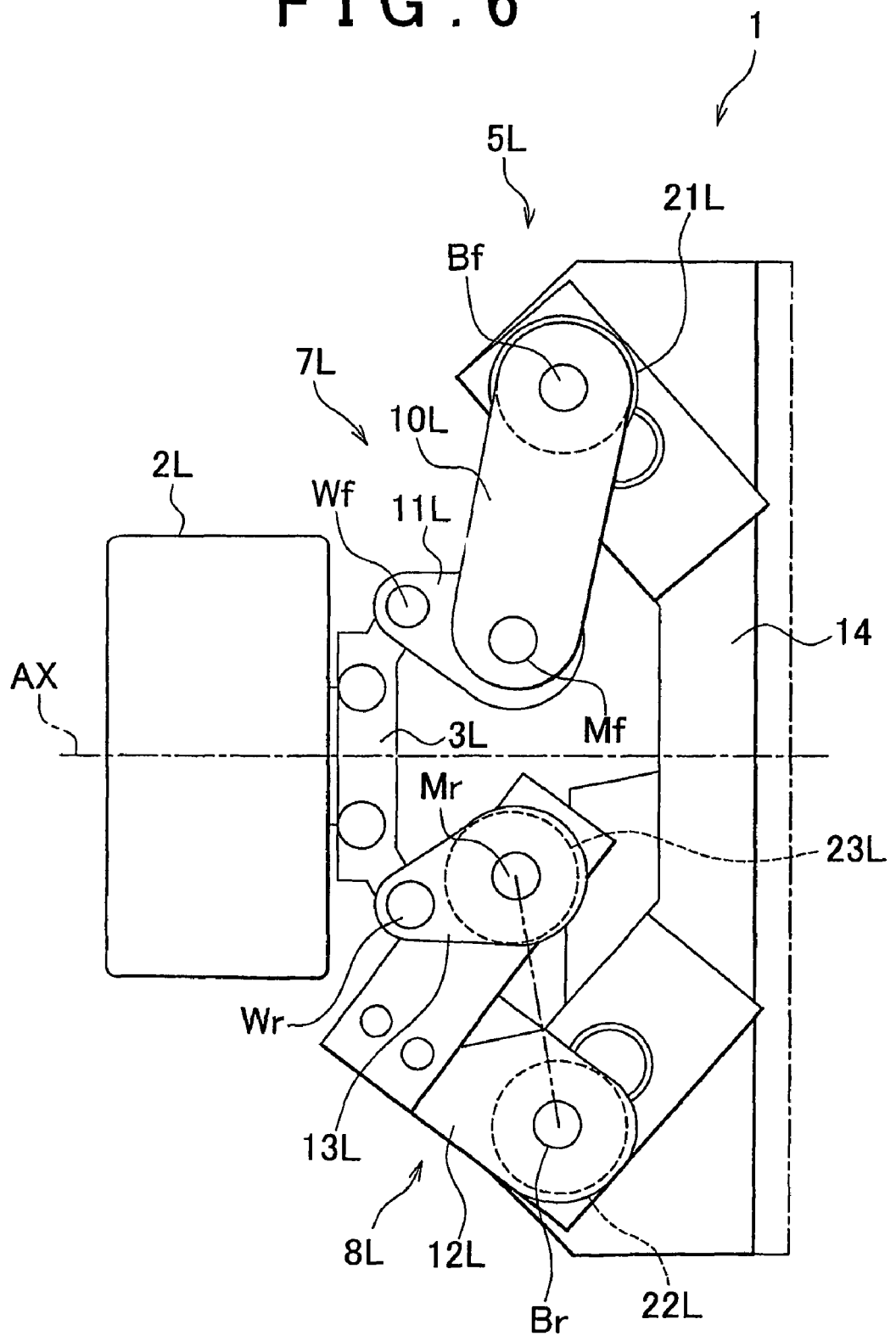
FIG. 6 is a view showing a specific example of the steering device shown in FIG. 1.

While in the above-mentioned embodiment the links 10 to 13 are all depicted as being linear, the actual shape of the links 10 to 13 is not limited to such a simple shape. A more specific example of the steering device 1 shown in FIG. 1 is illustrated in FIG. 6. FIG. 6 shows only the left arm mechanism 5L, and the right arm mechanism 5R is symmetrical to the left arm mechanism 5L. In the case of FIG. 6, the link 12L of the rear arm 8L is formed as a member that is bent in an L shape. In this case, the line segment connecting between the body-side connecting point Br and the intermediate connecting point Mr corresponds to the link 12L in FIG. 1.

The present invention is not limited to the above-described embodiment but may be implemented in various embodiments. For example, as for the positions of the servomotors 21 to 23, the servomotors 21 to 23 may be placed at the wheel-side connecting points Wf, Wr and another connecting point. That is, it suffices that the servomotors 21 to 23 be placed in association with three connecting points out of the six connecting points. A configuration is possible in which each of the front arm 7 and the rear arm 8 includes three or more links, the links are connected in series, and the links are rotatably connected to each other at the connecting point (intermediate connecting point) between adjacent links. Even when the number of links is increased, if the link angles around a number of connecting points equal to the total number of connecting points minus 3 are specified by the link driving devices, then the link angles around the three other remaining connecting points are uniquely determined. However, it is also possible to place a link driving device at least one of the three remaining connecting points, and control the actions of individual link driving devices in such a way as to ensure that there will be no inconsistency in link angle between this link driving device and the link driving devices at other connecting points. The link driving device to be used is not limited to a servomotor, but various types of actuator or driving mechanism that can rotationally drive a link around a connecting point to specify its angle may be used. Also, there may be provided a link driving device of a type which transmits the rotary motion of one of the servomotors to another connecting point by a motion transmission mechanism such as a gear mechanism to thereby change the link angle around this connecting point. Further, at least one of the links may be a direct drive actuator that can extend and contract.

Plural sets of the above-mentioned steering device may be provided in the vertical direction of the vehicle, and the arm mechanisms may be driven independently from each other in individual sets. In this case, the positions of the wheel-side connecting points Wf, Wr in individual sets can be set independently from each other, so the virtual kingpin axis can be operated three-dimensionally to change the camber angle, the caster angle, and the toe angle. In that case, spherical bearings, bushes, or the like are used for individual connecting points so that links are connected in a manner allowing their relative rotation in the three-dimensional direction around the connecting points.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A vehicle steering device, comprising:
left and right arm mechanisms placed between a vehicle body and respective wheel-mounting portions, the left and right arm mechanisms each having a front arm and a rear arm,
  the front arm having one end rotatably connected at a wheel-side front connecting point to the wheel-mounting portion, and the other end rotatably connected at a body-side front connecting point to the vehicle body,
  the rear arm having one end rotatably connected at a wheel-side rear connecting point to the wheel-mounting portion, and the other end rotatably connected at a body-side rear connecting point to the vehicle body,
  the wheel-side front connecting point and the wheel-side rear connecting point being spaced apart from each other in a longitudinal direction of a vehicle,
  the body-side front connecting point and the body-side rear connecting point being spaced apart from each other in the longitudinal direction of the vehicle, the front arm and the rear arm each including a plurality of links, adjacent links of which are rotatably connected to each other at an intermediate connecting point; and an arm driving device that drives the left and right arm mechanisms independently from each other, the arm driving device driving the left and right arm mechanisms such that angles of the links around the body-side front connecting point, the body-side rear connecting point, the intermediate connecting points, the wheel-side front connecting point, and the wheel-side rear connecting point are uniquely determined.

2. The vehicle steering device according to claim 1, wherein the arm driving device has a number of link driving devices equal to a number obtained by subtracting 3 from a total number of the body-side front connecting point, the body-side rear connecting point, the intermediate connecting point, the wheel-side front connecting point, and the wheel-side rear connecting point in each of the left and right arm mechanisms;

the link driving devices are respectively placed in association with a number of connecting points equal to the number of the link driving devices and selected from among the body-side front connecting point, the body-side rear connecting point, the intermediate connecting point, the wheel-side front connecting point, and the wheel-side rear connecting point; and the link driving devices rotationally drive the links around corresponding connecting points to specify angles of the links.

3. The vehicle steering device according to claim 2, wherein the link driving devices each include a servomotor.

4. The vehicle steering device according to claim 3, wherein as a result of the angles of the links around the selected connecting points being specified by the link driving devices, angles of links around unselected connecting points with which the link driving devices are not associated are determined.

5. The vehicle steering device according to claim 3, wherein the front arm connects between the body-side front connecting point and the wheel-side front connecting point by the plurality of links that are connected in series;

the rear arm connects between the body-side rear connecting point and the wheel-side rear connecting point by the plurality of links that are connected in series; and mutually adjacent links of the plurality of links are rotatably connected to each other at the intermediate connecting point.

6. The vehicle steering device according to claim 2, wherein as a result of the angles of the links around the selected connecting points being specified by the link driving devices, angles of links around unselected connecting points with which the link driving devices are not associated are determined.

7. The vehicle steering device according to claim 6, wherein the front arm connects between the body-side front connecting point and the wheel-side front connecting point by the plurality of links that are connected in series;

the rear arm connects between the body-side rear connecting point and the wheel-side rear connecting point by the plurality of links that are connected in series; and mutually adjacent links of the plurality of links are rotatably connected to each other at the intermediate connecting point.

8. The vehicle steering device according to claim 2, wherein the front arm connects between the body-side front connecting point and the wheel-side front connecting point by the plurality of links that are connected in series;

the rear arm connects between the body-side rear connecting point and the wheel-side rear connecting point by the plurality of links that are connected in series; and mutually adjacent links of the plurality of links are rotatably connected to each other at the intermediate connecting point.

9. The vehicle steering device according to claim 1, wherein the front arm connects between the body-side front connecting point and the wheel-side front connecting point by the plurality of links that are connected in series;

the rear arm connects between the body-side rear connecting point and the wheel-side rear connecting point by the plurality of links that are connected in series; and mutually adjacent links of the plurality of links are rotatably connected to each other at the intermediate connecting point.

10. The vehicle steering device according to claim 1, wherein at least one of the plurality of links is bent.

11. The wheel steering device according to claim 1, wherein the arm driving device includes a plurality of link driving devices that rotationally drive a link to which a respective link driving device is attached.

12. The wheel steering device according to claim 11, wherein the plurality of link driving devices includes a first link driving device at the body-side front connecting point that rotationally drives a first front link that attaches to the body-side front connecting point and to a front intermediate connecting point.

13. The wheel steering device according to claim 12, wherein the plurality of link driving devices includes a second link driving device at the body-side rear connecting point that rotationally drives a first rear link that attaches to the body-side rear connecting point and to a rear intermediate connecting point.

14. The wheel steering device according to claim 13, wherein the plurality of link driving devices includes a third link driving device at the rear intermediate connecting point that rotationally drives a second rear link that attaches to the rear intermediate connecting point and to the wheel-side rear connecting point.

15. The wheel steering device according to claim 11, wherein the plurality of link driving devices are servomotors.

* * * * *